(12) United States Patent
Okumoto et al.

(10) Patent No.: US 12,117,740 B2
(45) Date of Patent: Oct. 15, 2024

(54) CHARGING ROLLER AND IMAGE FORMING APPARATUS

(71) Applicant: Archem Inc., Tokyo (JP)

(72) Inventors: Kaori Okumoto, Tokyo (JP); Makoto Otsuru, Tokyo (JP)

(73) Assignee: Archem Inc., Tokyo (JP)

( * ) Notice: Subject to any disclaimer, the term of this patent is extended or adjusted under 35 U.S.C. 154(b) by 484 days.

(21) Appl. No.: 17/616,024

(22) PCT Filed: Dec. 11, 2019

(86) PCT No.: PCT/JP2019/048439
§ 371 (c)(1),
(2) Date: Dec. 2, 2021

(87) PCT Pub. No.: WO2020/255449
PCT Pub. Date: Dec. 24, 2020

(65) Prior Publication Data
US 2022/0291606 A1    Sep. 15, 2022

(30) Foreign Application Priority Data

Jun. 17, 2019 (JP) .................. 2019-112083

(51) Int. Cl.
*G03G 15/02* (2006.01)
*F16C 13/00* (2006.01)

(52) U.S. Cl.
CPC ......... *G03G 15/0233* (2013.01); *F16C 13/00* (2013.01)

(58) Field of Classification Search
CPC ........... G03G 15/0233; G03G 56/1479; G03G 56/14734; G03G 56/14704; G03G 56/0818
USPC ................. 399/159, 176; 492/56, 18, 53
See application file for complete search history.

(56) References Cited

U.S. PATENT DOCUMENTS

| | | | |
|---|---|---|---|
| 7,907,878 B2 | 3/2011 | Takagi et al. |
| 9,256,153 B2 | 2/2016 | Aoyama et al. |
| 10,571,822 B2 | 2/2020 | Sano |
| 2007/0197362 A1 | 8/2007 | Sakata et al. |
| 2007/0268587 A1 | 11/2007 | Ninomiya et al. |

(Continued)

FOREIGN PATENT DOCUMENTS

| CN | 101074996 A | 11/2007 |
|---|---|---|
| CN | 101182860 A | 5/2008 |

(Continued)

OTHER PUBLICATIONS

JP-2017032821-A—English Translation (Year: 2017).*

(Continued)

*Primary Examiner* — Jason L Vaughan
(74) *Attorney, Agent, or Firm* — KENJA IP LAW PC

(57) ABSTRACT

Provided is a charging roller that can achieve excellent image quality and prevent detachment of particles in its surface layer. A charging roller 1 comprises a shaft 2 and, on an outer circumferential side of the shaft 2, at least a base layer 3 and a surface layer 4, wherein the surface layer 4 contains a binder resin 41 and particles 42, and the particles 42 contain 50 mass % or more of a same component A as at least one selected from components constituting the binder resin 41, and a content of the particles in the surface layer is 30 parts to 120 parts by mass with respect to 100 parts by mass of the binder resin.

7 Claims, 3 Drawing Sheets

(56) References Cited

U.S. PATENT DOCUMENTS

| | | | |
|---|---|---|---|
| 2010/0248101 A1* | 9/2010 | Yamada | G03G 5/0766 |
| | | | 430/58.35 |
| 2013/0122311 A1 | 5/2013 | Yoshihara et al. | |
| 2014/0308607 A1 | 10/2014 | Taniguchi et al. | |
| 2017/0355178 A1 | 12/2017 | Sano | |
| 2018/0275552 A1* | 9/2018 | Satoh | C09D 7/69 |

FOREIGN PATENT DOCUMENTS

| | | | |
|---|---|---|---|
| CN | 102667535 A | | 9/2012 |
| CN | 102884452 A | | 1/2013 |
| CN | 104969131 A | | 10/2015 |
| CN | 107206775 A | | 9/2017 |
| CN | 107894623 A | | 4/2018 |
| EP | 2952966 A1 | | 12/2015 |
| GB | 1405679 A | | 9/1975 |
| JP | 2005283912 A | | 10/2005 |
| JP | 2005352014 A | | 12/2005 |
| JP | 2005352181 A | | 12/2005 |
| JP | 2007-248945 A | | 9/2007 |
| JP | 2011-065188 A | | 3/2011 |
| JP | 2013-120361 A | | 6/2013 |
| JP | 2013-142879 A | | 7/2013 |
| JP | 2015-212812 A | | 11/2015 |
| JP | 2017032821 A | * | 2/2017 |
| JP | 2018-060162 A | | 4/2018 |
| WO | 2017/135324 A1 | | 8/2017 |

OTHER PUBLICATIONS

International Search Report of PCT/JP2019/048439 dated Feb. 18, 2020 [PCT/ISA/210].

Jul. 17, 2023, search result of Office Action issued by the China National Intellectual Property Administration in the corresponding Chinese Patent Application No. 201980097218.4.

Jun. 2, 2023, search result of the Extended European Search Report issued by the European Patent Office in the corresponding European Patent Application No. 19933313.9.

Feb. 21, 2023, search result of Office Action issued by the China National Intellectual Property Administration in the corresponding Chinese Patent Application No. 201980097218.4.

International Preliminary Report on Patentability with the translation of Written Opinion dated Dec. 21, 2021 from the International Bureau in International application No. PCT/JP2019/048439.

* cited by examiner

CHARGING ROLLER AND IMAGE FORMING APPARATUS

CROSS REFERENCE TO RELATED APPLICATIONS

This application is a National Stage of International Application No. PCT/JP2019/048439 filed on Dec. 11, 2019, claiming priority based on Japanese Patent Application No. 2019-112083 filed on Jun. 17, 2019.

TECHNICAL FIELD

The present disclosure relates to a charging roller and an image forming apparatus.

BACKGROUND

In electrophotographic apparatuses such as copiers and laser beam printers (LBP), the following printing method has been conventionally used: First, an electrostatic latent image is obtained by an electrostatic latent imaging process in which the surface of a photoreceptor is uniformly charged, an image is projected onto the photoreceptor from an optical system, and the charge on the part exposed to light is erased to form a latent image. A toner image is then formed by adhesion of toner and transferred to a recording medium such as paper.

For the first operation of charging the photoreceptor, a corona discharge method has been commonly used conventionally. However, the corona discharge method is not desirable in terms of machine safety and maintenance because application of a high voltage of 6 kV to 10 kV is required, and is also environmentally unsound because harmful substances such as ozone and NOx are emitted during corona discharge. Hence, efforts have been made to develop a new charging method that enables charging by lower applied voltage than corona discharge without emission of harmful substances such as ozone. Specifically, there has been proposed a charging method of contact type whereby a charging member to which a voltage is applied is brought into contact with a body to be charged, such as a photoreceptor, with predetermined pressure to charge the body.

As the charging member used in this contact charging method, for example, there is known a charging roller having a multilayer structure in which, on the outer circumferential side of a shaft, a conductive elastic layer (base layer) made of rubber, urethane foam, or the like is formed and further a surface layer for improving surface properties is provided. A known technique involves containing, in the surface layer of the charging roller, particles made of resin or the like in order to control the surface roughness and obtain high discharge characteristics.

As the technique of containing particles in the surface layer, for example, JP 2011-65188 A (PTL 1) discloses a developing roller having, on the outer side of a shaft, at least one resin layer that contains 0.1 parts to 100 parts by weight of fine particles with respect to 100 parts by weight of resin.

JP 2013-142879 A (PTL 2) discloses a charging roller having a surface layer that contains 10 parts by mass or more of fluorine-containing spherical acrylic particles with respect to 100 parts by mass of resin.

CITATION LIST

Patent Literature

PTL 1: JP 2011-65188 A
PTL 2: JP 2013-142879 A

SUMMARY

Technical Problem

With each of the techniques disclosed in PTL 1 and PTL 2, when the charging roller comes into contact with a photoreceptor, a load may be exerted on particles in the surface layer of the charging roller and cause the particles to detach from the surface layer. In the case where the particles detach from the surface layer of the charging roller, desired charging properties are unlikely to be achieved, causing a decrease in image quality. Accordingly, a technique that can prevent detachment of particles is needed.

It could therefore be helpful to provide a charging roller that can achieve excellent image quality and prevent detachment of particles in its surface layer. It could also be helpful to provide an image forming apparatus that can prevent detachment of particles in a surface layer of a charging roller and achieve excellent image quality.

Solution to Problem

A charging roller according to the present disclosure is a charging roller comprising a shaft and, on an outer circumferential side of the shaft, at least a base layer and a surface layer that forms a roller surface, wherein the surface layer contains a binder resin and particles, and the particles contain 50 mass % or more of a same component as at least one selected from components constituting the binder resin.

Thus, it is possible to provide a charging roller that can prevent detachment of particles contained in its surface layer and achieve excellent image quality.

Preferably, in the charging roller according to the present disclosure, the particles contain an acrylic monomer as the same component as the at least one selected from the components constituting the binder resin. Thus, the effect of preventing the detachment of the particles in the surface layer and the image quality can both be achieved at higher level.

Preferably, in the charging roller according to the present disclosure, an average particle size of the particles is 3 μm to 30 μm. Thus, the effect of preventing the detachment of the particles in the surface layer and the image quality can both be achieved at higher level.

Preferably, in the charging roller according to the present disclosure, a content of the particles in the surface layer is 30 parts to 120 parts by mass with respect to 100 parts by mass of the binder resin. Thus, the effect of preventing the detachment of the particles in the surface layer and the image quality can both be achieved at higher level.

Preferably, in the charging roller according to the present disclosure, the base layer contains an ultraviolet curable resin. Thus, the image quality can be further improved.

Preferably, in the charging roller according to the present disclosure, the acrylic monomer contains a multifunctional acrylate. More preferably, the multifunctional acrylate is ethoxylated isocyanuric acid triacrylate. Thus, the effect of preventing the detachment of the particles in the surface layer and the image quality can both be achieved at higher level.

Preferably, in the charging roller according to the present disclosure, the binder resin in the surface layer is formed by curing an ultraviolet curable resin composition containing an urethane acrylate oligomer, a photopolymerization initiator, a conducting agent, and an acrylic monomer.

An image forming apparatus according to the present disclosure comprises the above-described charging roller according to the present disclosure.

Thus, the detachment of the particles in the surface layer of the charging roller can be prevented and excellent image quality can be achieved.

Advantageous Effect

It is therefore possible to provide a charging roller that can achieve excellent image quality and prevent detachment of particles in its surface layer. It could also be helpful to provide an image forming apparatus that can prevent detachment of particles in a surface layer of a charging roller and achieve excellent image quality.

DETAILED DESCRIPTION

A charging roller according to the present disclosure is a charging roller comprising a shaft and, on an outer circumferential side of the shaft, at least a base layer and a surface layer that forms a roller surface, wherein the surface layer contains a binder resin and particles, and the particles contain 50 mass % or more of a same component as at least one selected from components constituting the binder resin.

An embodiment of the present disclosure will be described below, with reference to the drawings.

Figure 1:
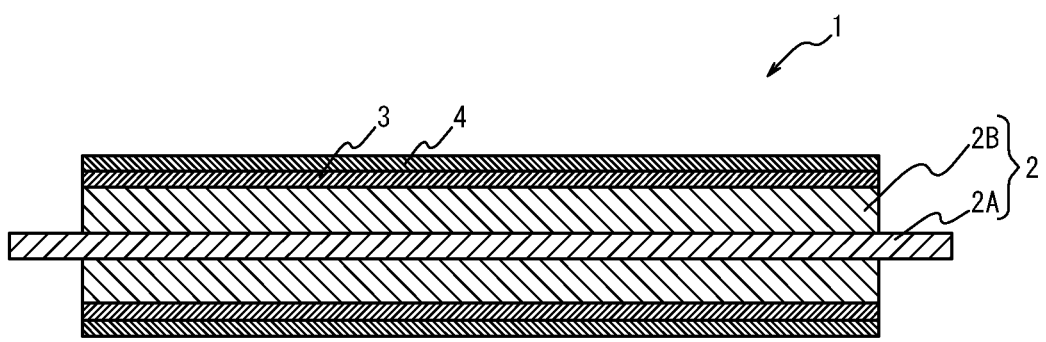
FIG. 1 is a sectional view schematically illustrating an embodiment of a charging roller according to the present disclosure.
Figure 2:
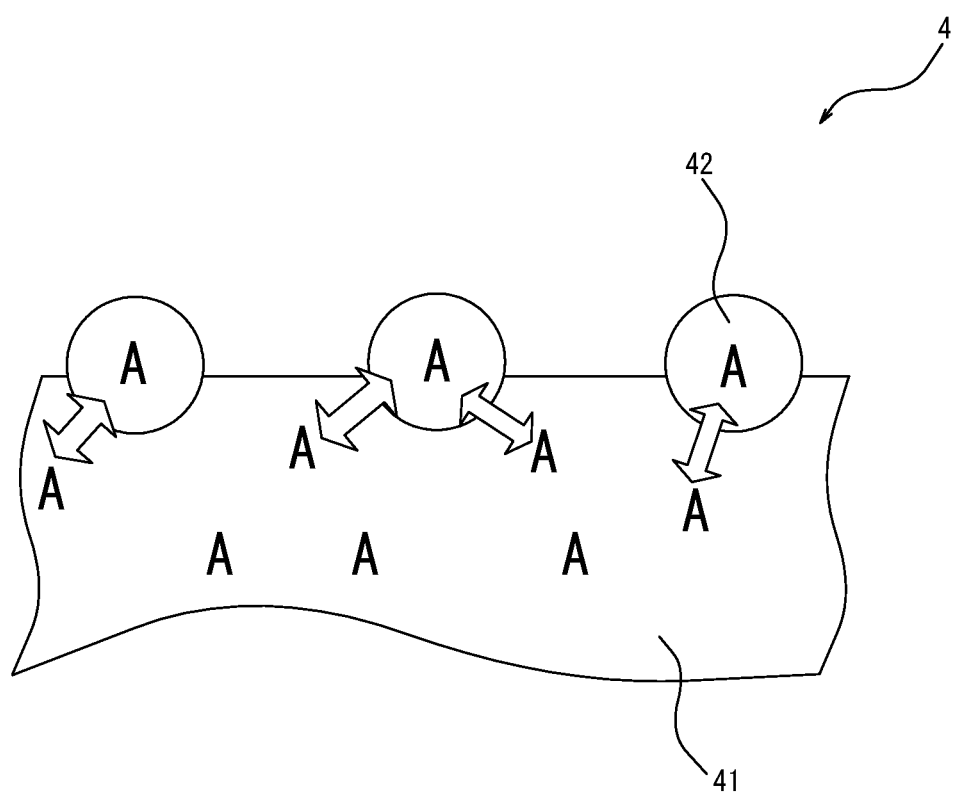
FIG. 2 is a sectional view schematically illustrating part of a surface layer in the embodiment of the charging roller according to the present disclosure.

FIG. 1 is a sectional view schematically illustrating an embodiment of a charging roller according to the present disclosure. FIG. 2 is an enlarged view schematically illustrating part of a surface layer in the embodiment of the charging roller according to the present disclosure.

<Charging Roller>

The charging roller in this embodiment is a charging roller 1 including a shaft 2 and, on the outer circumferential side of the shaft 2, at least a base layer 3 and a surface layer 4 that forms the surface of the roller, as illustrated in FIG. 1.

In this embodiment, the surface layer 4 contains a binder resin 41 and particles 42, as illustrated in FIG. 2. The particles 42 contain 50 mass % or more of the same component (indicated as "A" in FIG. 2) as at least one selected from the components constituting the binder resin, and the content of the particles in the surface layer is 30 parts to 120 parts by mass with respect to 100 parts by mass of the binder resin.

In the charging roller 1 in this embodiment, the particles 42 contain the same component as the component A in the binder resin 41 in the predetermined amount (50 mass %) or more, and the content of the particles 42 is limited to the appropriate range. Hence, the compatibility between the particles 42 and the binder resin 41 is improved and the adhesiveness between the particles 42 and the binder resin 41 is enhanced, as a result of which the effect of preventing the detachment of the particles 42 can be significantly enhanced. Consequently, the charging roller 1 in this embodiment can maintain the image quality improving effect by the inclusion of the particles 42 in the roller, for a long time.

In a conventional charging roller, on the other hand, the compatibility between the particles 42 and the binder resin 41 is not high, and therefore the particle detachment prevention effect is insufficient.

Each structural member in the charging roller in this embodiment will be described below.

(Surface Layer)

The surface layer 4 included in the charging roller 1 in this embodiment is a layer formed on the base layer 3 directly or with an optional intermediate layer therebetween, as illustrated in FIG. 1.

The surface layer 4 contains the binder resin 41 and the particles 42, as illustrated in FIG. 2. The particles 42 contain 50 mass % or more of the same component (indicated as "A" in FIG. 2) as at least one selected from the components constituting the binder resin. Thus, the particles 42 can be effectively prevented from detaching from the binder resin 41. From the same viewpoint, the particles 42 preferably contain 70 mass % or more of the same component as at least one selected from the components constituting the binder resin, more preferably contain 80 mass % or more of the same component, and most preferably contain 100 mass % of the same component.

Herein, "the same component as at least one selected from the components constituting the binder resin", which is contained in the particles, denotes a component that not only categorically belongs to the same group as the at least one selected from the components constituting the binder resin but also has the same composition as the at least one component.

As illustrated in FIG. 2, as a result of the surface layer 4 containing the particles 42, when the charging roller 1 is brought into contact with a photoreceptor to charge the photoreceptor, many particles at the surface of the surface layer 4 come into contact with the surface of the photoreceptor. As these particles support the photoreceptor, minute gaps (spaces) form between the charging roller 1 and the photoreceptor easily. These minute gaps (spaces) allow uniform discharge from the charging roller 1 to which a voltage is applied to the photoreceptor, so that the image quality can be improved.

The material forming the particles in the surface layer is not limited as long as it contains 50 mass % or more of the same component as at least one selected from the components constituting the binder resin. Examples of the material of the particles include an acrylic monomer, amine, and melamine.

Of these, the same component as at least one selected from the components constituting the binder resin in the surface layer is preferably an acrylic monomer, from the viewpoint of achieving both the effect of preventing the detachment of the particles in the surface layer and the image quality at higher level.

In the case where the same component as at least one selected from the components constituting the binder resin, which is contained in the particles, is an acrylic monomer, the acrylic monomer is preferably a multifunctional acrylate, and more preferably ethoxylated isocyanuric acid triacrylate. Thus, the effect of preventing the detachment of the particles in the surface layer and the image quality can be achieved at higher level.

The types and the like of the acrylic monomer will be described later in the description of the acrylic monomer in the binder resin.

The particles may be particles of one type, or a mixture of particles of a plurality of types. In the case of using a mixture of particles of a plurality of types, the particles of each type need to contain 50 mass % or more of the same component as the component contained in the binder resin.

In this embodiment, the average particle size of the particles is preferably 3 µm to 30 µm, more preferably 6 µm to 10 µm, and further preferably 10 µm to 28 µm. As a result of the average particle size of the particles being 3 µm or more, the minute gaps between the charging roller and the photoreceptor can be formed on the surface layer sufficiently uniformly while maintaining an appropriate distance between the minute gaps. If the average particle size of the particles is excessively large, discharge from the charging roller to the photoreceptor may not occur at particles having large particle sizes, causing a phenomenon called voids. This results in a decrease in image resolution. As a result of the average particle size of the particles being 30 µm or less, discharge from the charging roller to the photoreceptor takes place appropriately, so that the image resolution can be ensured effectively.

In the case where the particles contained in the surface layer are a mixture of particles of a plurality of types, the average particle size of the particles is an average particle size measured in a state in which the particles of the plurality of types are mixed. Herein, the average particle size of the particles denotes a volume-average particle size (Mv) determined by a laser diffraction/scattering method. In the case where the particles contained in the surface layer 4 are a mixture of particles of a plurality of types (in the case where the shape of the particle size distribution curve of the particles contained in the surface layer is multimodal), the average particle size of the particles is an average particle size measured in a state in which the particles of the plurality of types are mixed.

The content of the particles in the surface layer needs to be 30 parts to 120 parts by mass with respect to 100 parts by mass of the binder resin. As a result of the content of the particles being 30 parts by mass or more with respect to 100 parts by mass of the binder resin, minute gaps can be formed on the surface layer of the charging roller, so that the image quality can be improved. As a result of the content of the particles being 120 parts by mass or less with respect to 100 parts by mass of the binder resin, the detachment of the particles can be prevented more effectively.

From the same viewpoint, the content of the particles is preferably 50 parts to 100 parts by mass and more preferably 60 parts to 90 parts by mass with respect to 100 parts by mass of the binder resin.

The surface layer 4 in the charging roller 1 in this embodiment contains the binder resin 41 in addition to the particles 42, as illustrated in FIG. 2. The binder resin 41 is a component serving as a base material of the surface layer 4.

The surface layer 4 containing the binder resin 41 and the particles 42 can be formed, for example, from the below-described layer-forming raw material.

The layer-forming raw material contains the particles. The layer-forming raw material can further contain an ultraviolet curable resin composition containing the same component as the component contained in the particles in an amount of 50 mass % or more and also containing, for example, a urethane acrylate oligomer, a photopolymerization initiator, and a conducting agent, as components constituting the binder resin. The layer-forming raw material may contain various additives unless the object according to the present disclosure is undermined.

As the urethane acrylate oligomer contained in the layer-forming raw material, the following compound can be used: The compound is synthesized using, as a polyol, a high-purity polyol satisfying the following formula (I)

$$y \leq 0.6/x + 0.01 \tag{I}$$

(where x is the hydroxyl value (mgKOH/g) of the polyol and y is the total unsaturation degree (meq/g) of the polyol) alone or together with another polyol, has one or more acryloyloxy groups ($CH_2$=CHCOO—), and has a plurality of urethane bonds (—NHCOO—). For example, such urethane acrylate oligomer can be synthesized by (i) adding a hydroxyl group-containing acrylate to an urethane prepolymer synthesized from a high-purity polyol alone or a mixture of the high-purity polyol and another polyol and polyisocyanate, or (ii) adding a hydroxyl group-containing acrylate to a mixture of an urethane prepolymer synthesized from a high-purity polyol alone or a mixture of the high-purity polyol and another polyol and polyisocyanate and an urethane prepolymer synthesized from another polyol and polyisocyanate. The high-purity polyol used in the synthesis of the urethane prepolymer can be, for example, synthesized by adding alkylene oxide such as propylene oxide or ethylene oxide to polyhydric alcohol such as ethylene glycol, propylene glycol, glycerin, neopentyl glycol, trimethylolpropane, pentaerythritol, or a compound obtained by reacting any of these with alkylene oxide, in the presence of a catalyst such as diethyl zinc, iron chloride, metal porphyrin, a composite metal cyanide complex, or a cesium compound. Such high-purity polyol has little monool by-products such as unsaturated terminals, and has higher purity than conventional polyols.

By forming a layer through ultraviolet irradiation using the urethane acrylate oligomer synthesized using the high-purity polyol satisfying the formula (I), it is possible to reduce staining of an adjacent member by the charging roller while reducing compressive residual strain. From the viewpoint of achieving this effect, the total unsaturation degree of the high-purity polyol is preferably 0.05 meq/g or less, more preferably 0.025 meq/g or less, and further preferably 0.01 meq/g or less.

The high-purity polyol used in the synthesis of the urethane acrylate oligomer preferably has a weight-average molecular weight (Mw) of 1,000 to 16,000. As a result of the molecular weight of the high-purity polyol being 1,000 or more, the hardness of the layer can be kept low to ensure favorable image properties. As a result of the molecular weight of the high-purity polyol being 16,000 or less, an increase in compressive residual strain can be suppressed to prevent image defects caused by deformation of the charging roller.

Another polyol that can be used together with the high-purity polyol in the synthesis of the urethane acrylate oligomer is a compound having a plurality of hydroxyl groups (OH groups). Specific examples of such polyol include polyether polyol, polyester polyol, polybutadiene polyol, alkylene oxide-modified polybutadiene polyol, and polyisoprene polyol. The polyether polyol is obtained, for example, by adding alkylene oxide such as ethylene oxide or propylene oxide to polyhydric alcohol such as ethylene glycol, propylene glycol, or glycerin. The polyester polyol is obtained, for example, from polyhydric alcohol such as ethylene glycol, diethylene glycol, 1,4-butanediol, 1,6-hexanediol, propylene glycol, trimethylolethane, or trimethylolpropane and polyhydric carboxylic acid such as adipic acid, glutaric acid, succinic acid, sebacic acid, pimelic acid, or suberic acid. One of these polyols may be used alone, or a blend of two or more of these polyols may be used.

In the case where another polyol (a2) is used together with the high-purity polyol (a1) in the synthesis of the urethane acrylate oligomer, the mass ratio (a1/a2) of the high-purity polyol (a1) and the other polyol (a2) is preferably in a range of 100/0 to 30/70. As a result of the proportion of the high-purity polyol (a1) in the total amount (a1+a2) of the high-purity polyol (a1) and the other polyol (a2) being 30 mass % or more (i.e. as a result of the proportion of the other polyol (a2) being 70 mass % or less), staining of an adjacent member such as the photoreceptor can be sufficiently reduced while reducing the compressive residual strain of the layer.

In the synthesis of the urethane acrylate oligomer, a catalyst for urethanization reaction is preferably used. Examples of the catalyst for urethanization reaction include organic tin compounds such as dibutyltin dilaurate, dibutyltin diacetate, dibutyltin thiocarboxylate, dibutyltin dimaleate, dioctyltin thiocarboxylate, octenoic acid tin, and monobutyltin oxide; inorganic tin compounds such as stannous chloride; organolead compounds such as octenoic acid lead; monoamines such as triethylamine and dimethylcyclohexylamine; diamines such as tetramethylethylenediamine, tetramethylpropanediamine, and tetramethylhexanediamine; triamines such as pentamethyldiethylenetriamine, pentamethyldipropylenetriamine, and tetramethylguanidine; cyclic amines such as triethylenediamine, dimethylpiperazine, methylethylpiperazine, methylmorpholine, dimethylaminoethylmorpholine, dimethylimidazole, and pyridine; alcohol amines such as dimethylaminoethanol, dimethylaminoethoxyethanol, trimethylaminoethylethanolamine, methylhydroxyethylpiperazine, and hydroxyethylmorpholine; ether-amines such as bis(dimethylaminoethyl)ether and ethylene glycolbis(dimethyl)aminopropyl ether; organic sulfonic acids such as p-toluenesulfonic acid, methanesulfonic acid, and fluorosulfuric acid; inorganic acids such as sulfuric acid, phosphoric acid, and perchloric acid; bases such as sodium alcoholate, lithium hydroxide, aluminum alcoholate, and sodium hydroxide; titanium compounds such as tetrabutyl titanate, tetraethyl titanate, and tetraisopropyl titanate; bismuth compounds; and quaternary ammonium salts. Of these catalysts, organic tin compounds are preferable. One of these catalysts may be used alone, or two or more of these catalysts may be used in combination. The amount of the catalyst used is preferably in a range of 0.001 parts to 2.0 parts by mass with respect to 100 parts by mass of the polyol.

The hydroxyl group-containing acrylate that can be used in the synthesis of the urethane acrylate oligomer is a compound having one or more hydroxyl groups and one or more acryloyloxy groups ($CH_2$=CHCOO—). The hydroxyl group-containing acrylate can be added to an isocyanate group in the urethane prepolymer. Examples of the hydroxyl group-containing acrylate include 2-hydroxyethyl acrylate, 2-hydroxypropyl acrylate, and pentaerythritol triacrylate. One of these hydroxyl group-containing acrylates may be used alone, or two or more of these hydroxyl group-containing acrylates may be used in combination.

The photopolymerization initiator used in the layer-forming raw material has action of initiating polymerization of the above-described urethane acrylate oligomer and initiating polymerization of the below-described acrylic monomer when irradiated with ultraviolet light. Examples of the photopolymerization initiator include benzophenone derivatives such as 4-dimethylamino benzoic acid, 4-dimethylamino benzoic acid ester, 2,2-dimethoxy-2-phenyl acetophenone, acetophenone diethyl ketal, alkoxy acetophenone, benzyl dimethyl ketal, benzophenone 3,3-dimethyl-4-methoxy benzophenone, 4,4-dimethoxy benzophenone, and 4,4-diamino benzophenone; benzyl derivatives such as benzoyl benzoic acid alkyl, bis(4-dialkylaminophenyl)ketone, benzyl, and benzyl methyl ketal; benzoin derivatives such as benzoin and benzoin isobutyl ether; benzoin isopropyl ether, 2-hydroxy-2-methylpropiophenone, 1-hydroxycyclohexylphenylketone, xanthone, thioxanthone, and thioxanthone derivatives; and fluorene, 2,4,6-trimethylbenzoyldiphenylphosphine oxide, bis(2,6-dimethoxybenzoyl)-2,4,4-trimethylpentylphosphine oxide, bis(2,4,6-trimethylbenzoyl)-phenylphosphine oxide, and 2-methyl-1[4-(methylthio)phenyl]-2-morpholinopropane-1,2-benzyl-2-dimethylamino-1-(morpholinophenyl)-butanone-1. One of these photopolymerization initiators may be used alone, or two or more of these photopolymerization initiators may be used together.

The conducting agent contained in the layer-forming raw material has action of imparting conductivity to the layer. The conducting agent is preferably capable of transmitting ultraviolet light. An ionic conducting agent and a transparent electronic conducting agent are preferable, and an ionic conducting agent is particularly preferable. The ionic conducting agent dissolves in the urethane acrylate oligomer and has transparency. Accordingly, in the case where the ionic conducting agent is used as the conducting agent, even if the layer-forming raw material is thickly applied onto the shaft, ultraviolet light can reach the inside sufficiently and cure the layer-forming raw material sufficiently. Examples of the ionic conducting agent include such as ammonium salts of perchlorates, chlorates, hydrochlorides, bromates, iodates, fluoroboric acid, sulfates, ethyl sulfates, carboxylates, and sulfonates like tetraethylammonium, tetrabutylammonium, dodecyltrimethylammonium, hexadecyltrimethylammonium, benzyl trimethylammonium, modified fatty acid dimethylethylammonium, etc.; and perchlorates, chlorates, hydrochlorides, bromates, iodates, fluoroboric acid salts, sulfates, trifluoromethyl sulfates, and sulfonates of alkali metals or alkaline earth metals such as lithium, sodium, potassium, calcium, and magnesium. Examples of the transparent electronic conducting agent include fine particles of metal oxides such as ITO, tin oxide, titanium oxide, and zinc oxide; fine particles of metals such as nickel, copper, silver, and germanium; and conductive whiskers such as conductive titanium oxide whiskers and conductive barium titanate whiskers. Examples of the electronic conducting agent include conductive carbon such as Ketjen black and acetylene black, carbon black for rubber such as SAF, ISAF, HAF, FEF, GPF, SRF, FT, and MT, color carbon black subjected to oxidation treatment or the like, pyrolysis carbon black, natural graphite, and artificial graphite. One of these conducting agents may be used alone, or two or more of these conducting agents may be used together.

The layer-forming raw material preferably further contains an acrylic monomer. As a result of the acrylic monomer being contained in the binder resin, in the case where the particles contains the acrylic monomer, the compatibility with the particles is high and the effect of preventing the particles from coming off the surface layer can be further enhanced. The acrylic monomer is a monomer having one or more acryloyloxy groups ($CH_2$=CHCOO—), and acts as a reactive diluent. That is, the acrylic monomer is capable of curing by ultraviolet light and also decreasing the viscosity of the layer-forming raw material. The acrylic monomer preferably has a functional group number of 1.0 to 10, and more preferably has a functional group number of 1.0 to 3.5. The acrylic monomer preferably has a molecular weight of 100 to 2,000, and more preferably has a molecular weight of 100 to 1,000.

Examples of the acrylic monomer include isocyanuric acid triacrylate, isomyristyl acrylate, methoxytriethylene glycol acrylate, ethyl acrylate, isobutyl acrylate, n-butyl acrylate, isoamyl acrylate, glycidyl acrylate, butoxyethyl acrylate, ethoxydiethylene glycol acrylate, methoxydipropylene glycol acrylate, phenoxyethyl acrylate, 2-hydroxyethyl acrylate, 2-hydroxypropyl acrylate, and pentaerythritol triacrylate. One of these acrylic monomers may be used alone, or two or more of these acrylic monomers may be used in combination.

Of these, a multifunctional acrylate is preferably contained as the acrylic monomer. Particles synthesized using a multifunctional acrylate are higher in hardness than particles synthesized using a functional acrylate, so that the distance between minute gaps between the charging roller and the photoreceptor can be maintained more adequately and higher image quality can be obtained.

The type of the multifunctional acrylate is not limited. Examples include ethoxylated isocyanuric acid triacrylate, ε-caprolactone-modified tris-(2-acryloxyethyl)isocyanurate, ethoxylated glycerin triacrylate, pentaerythritol triacrylate, trimethylolpropane triacrylate, ditrimethylolpropane tetraacrylate, ethoxylated pentaerythritol tetraacrylate, pentaerythritol tetraacrylate, dipentaerythritol polyacrylate, and dipentaerythritol hexaacrylate. Of these, ethoxylated isocyanuric acid triacrylate is preferably used from the viewpoint of achieving both the effect of preventing the detachment of the particles in the surface layer and the image quality at higher level.

The blending amount of the photopolymerization initiator in the layer-forming raw material is preferably in a range of 0.2 parts to 5.0 parts by mass with respect to 100 parts by mass of the total of the urethane acrylate oligomer and the acrylic monomer. As a result of the blending amount of the photopolymerization initiator being 0.2 parts by mass or more, the effect of initiating ultraviolet curing of the layer-forming raw material can be ensured. As a result of the blending amount of the photopolymerization initiator being 5.0 parts by mass or less, a decrease in properties such as compressive residual strain can be suppressed and the cost performance of the layer-forming raw material can be enhanced.

The blending amount of the conducting agent in the layer-forming raw material is preferably in a range of 0.1 parts to 5.0 parts by mass with respect to 100 parts by mass of the total of the urethane acrylate oligomer and the acrylate monomer. As a result of the blending amount of the conducting agent being 0.1 parts by mass or more, sufficient conductivity of the layer can be ensured to impart desired conductivity to the charging roller. As a result of the blending amount of the conducting agent being 5.0 parts by mass or less, the conductivity of the layer can be appropriately limited to suppress a decrease in properties such as compressive residual strain and ensure favorable image quality.

The surface layer preferably has a thickness of 5 μm to 10 μm. As a result of the thickness of the surface layer being 5 μm or more, the particles can be held sufficiently. As a result of the thickness of the surface layer being 10 μm or less, particles contained inside without being exposed at the surface of the surface layer can be reduced.

(Base Layer)

The charging roller 1 in this embodiment includes the base layer 3 located on the outer side of the shaft 2 in the radial direction, as illustrated in FIG. 1. As a layer-forming raw material forming the base layer 3, the same layer-forming raw material as that used to form the surface layer 4 may be used except that the particles contained in the surface layer 4 are not an essential component.

The base layer formed using the layer-forming raw material preferably has an Asker C hardness of 30 degrees to 70 degrees. The Asker C hardness is a value measured in a flat part of a cylindrical sample of 12.7 mm in height and 29 mm in diameter. As a result of the Asker C hardness being 30 degrees or more, sufficient hardness as a charging roller can be ensured. As a result of the Asker C hardness being 70 degrees or less, favorable followability for other rollers or blades can be obtained.

The base layer preferably has a compressive residual strain (compression set) of 3.0% or less. The compressive residual strain can be measured in accordance with JIS K 6262 (1997). Specifically, the compressive residual strain can be measured by compressing a cylindrical sample of 12.7 mm in height and 29 mm in diameter by 25% in the height direction under prescribed heat treatment conditions (70° C. for 22 hr). As a result of the compressive residual strain of the base layer being 3.0% or less, pressing marks by another member are unlikely to occur on the surface of the charging roller, and streaky image defects in the formed image are prevented.

The base layer preferably has a thickness of 1 μm to 3,000 μm. As a result of the thickness of the base layer being 1 μm or more, the charging roller has sufficient elasticity. As a result of the thickness of the base layer being 3,000 μm or less, ultraviolet light sufficiently reaches deep into the base layer during ultraviolet irradiation, and the layer-forming raw material can be reliably ultraviolet-cured. The usage of an expensive ultraviolet curable resin raw material can thus be reduced.

The base layer preferably has a specific resistance of $10^4 \Omega$ to $10^8 \Omega$, without being limited thereto. The specific resistance can be calculated from a current value when, in a state in which the outer circumferential surface of a roller having only the base layer formed on the shaft is pressed against a planar or cylindrical counter electrode with predetermined pressure, applying a voltage of 300 V between the shaft and the counter electrode.

The base layer preferably contains an ultraviolet curable resin, without being limited thereto. The base layer can thus be produced quickly and reliably.

In the case of forming the base layer using the layer-forming raw material, the charging roller in this embodiment can be easily produced by applying the layer-forming raw material to the outer surface of the shaft, then ultraviolet-irradiating the layer-forming raw material to form the base layer, further applying the layer-forming raw material containing the plurality of particles to the surface of the formed base layer, and ultraviolet-irradiating the layer-forming raw material to form the surface layer.

In this way, the charging roller in this embodiment can be produced in a short time with no need for a large amount of heat energy. Moreover, since a curing furnace or the like is not needed in the production, high equipment costs are not required. Examples of a method of applying the layer-forming raw material to the outer surface of the shaft 2 or the surface of the base layer 3 include a spray method, a roll coater method, a dipping method, and a die coating method. Examples of a light source used for ultraviolet irradiation include a mercury lamp, a high-pressure mercury lamp, an ultra-high-pressure mercury lamp, a metal halide lamp, and a xenon lamp. The ultraviolet irradiation conditions are selected as appropriate depending on, for example, the components, the composition, and the application quantity of the layer-forming raw material. The irradiation intensity, the cumulative light amount, and the like may be adjusted as appropriate.

The base layer in the charging roller in this embodiment may be formed by polyurethane foam. In this case, for example, the base layer made of polyurethane foam may be supported directly on the outer side of the below-described metal shaft 2A (see FIG. 1) in the radial direction.

A polyurethane resin used in the polyurethane foam that can form the base layer is not limited, and a conventionally known material may be selected and used as appropriate. The expansion ratio of the polyurethane foam is not limited, but is preferably about 1.2 times to 50 times and particularly preferably about 1.5 times to 10 times. The foam density is preferably about 0.1 $g/cm^3$ to 0.7 $g/cm^3$.

A conducting agent may be added to the polyurethane foam that can form the base layer. In this way, conductivity can be imparted or adjusted to set a predetermined resistance value. The conducting agent is not limited, and the same conducting agents as can be contained in the above-described ultraviolet curable resin may be used alone or in a mixture of two or more as appropriate. The blending amount of such conducting agent is selected as appropriate depending on required performance, and, for example, adjusted so as to limit the specific resistance of the base layer 3 to the foregoing range.

The base layer may optionally further contain, besides the conducting agent, known additives such as a water-resistant agent, a wetting agent, a foaming agent, a foam stabilizer, a curing agent, a thickener, a defoaming agent, a leveling agent, a dispersant, a thixotropic agent, an antiblocking agent, a crosslinking agent, and a film-forming aid in appropriate amounts.

The thickness of the base layer in this case is preferably 1.0 mm to 5.0 mm and more preferably 1.0 mm to 3.0 mm. As a result of the thickness of the base layer being in such range, spark discharge can be prevented.

In the case of forming the base layer by the polyurethane foam, the charging roller in this embodiment can be produced by supporting the polyurethane foam on the outer circumference of the shaft 2 by, for example, die forming using a cylindrical mold, then applying the layer-forming raw material containing the particles to the surface of the base layer made of the polyurethane foam, and ultraviolet-irradiating the layer-forming raw material to form the surface layer. The layer-forming raw material application method, the light source for ultraviolet irradiation, and the irradiation conditions in this case are not limited, and may be the same as the foregoing conditions.

(Other Layer(s))

In the charging roller in this embodiment, at least one other layer such as an intermediate layer may be provided between the base layer and the surface layer. The material forming the other layer is not limited. For example, a moisture curable resin may be used, or an ultraviolet curable resin obtained by blending an acrylate-containing oligomer with an amide-containing monomer such as an acryloyl morpholine monomer may be used.

The charging roller in this embodiment preferably has a specific resistance of $10^4 \Omega$ to $10^8 \Omega$. The specific resistance can be calculated from a current value when, in a state in which the outer circumferential surface of the roller is pressed against a planar or cylindrical counter electrode with predetermined pressure, applying a voltage of 300 V between the shaft and the counter electrode.

(Shaft)

The charging roller according to the present disclosure includes the shaft 2, as illustrated in FIG. 1. The material forming the shaft 2 is not limited as long as it has good conductivity. For example, the shaft 2 may be composed of only a shaft 2A made of metal, composed of only a high-rigidity resin base material 2B, or composed of a combination of the shaft 2A made of metal and the high-rigidity resin base material 2B. The shaft 2 may be a hollow cylindrical body made of metal or high-rigidity resin.

In the case of using high-rigidity resin in the shaft, it is preferable to add a conducting agent to and disperse it in the high-rigidity resin, to ensure sufficient conductivity. As the conducting agent dispersed in the high-rigidity resin, a powdery conducting agent such as a carbon black powder, a graphite powder, a carbon fiber, a metal powder of aluminum, copper, nickel, or the like, a metal oxide powder of tin oxide, titanium oxide, zinc oxide, or the like, or a conductive glass powder is preferable. One of these conducting agents may be used alone, or two or more of these conducting agents may be used in combination. The blending amount of the conducting agent is not limited, but is preferably in a range of 5 mass % to 40 mass % and more preferably in a range of 5 mass % to 20 mass % with respect to the whole high-rigidity resin.

Examples of the material of the metal shaft or the metal cylindrical body include iron, stainless steel, and aluminum. Such metal shaft or metal cylindrical body may be coated with zinc, nickel, or the like. Examples of the material of the high-rigidity resin base material 2B include polyacetal, polyamide 6, polyamide 6·6, polyamide 12, polyamide 4·6, polyamide 6·10, polyamide 6·12, polyamide 11, polyamide MXD6, polybutylene terephthalate, polyphenylene oxide, polyphenylene ether, polyphenylene sulfide, polyether sulfone, polycarbonate, polyimide, polyamideimide, polyetherimide, polysulfone, polyetheretherketone, polyethylene terephthalate, polyarylate, liquid crystal polymer, polytetrafluoroethylene, polypropylene, ABS resin, polystyrene, polyethylene, melamine resin, phenol resin, and silicone resin. Of these, polyacetal, polyamide 6·6, polyamide MXD6, polyamide 6·12, polybutylene terephthalate, polyphenylene ether, polyphenylene sulfide, and polycarbonate are preferable. One of these high-rigidity resins may be used alone, or two or more of these high-rigidity resins may be used in combination.

In the case where the shaft 2 is the metal shaft 2A or a shaft having the high-rigidity resin base material 2B on the outer side of the metal shaft 2A, the outer diameter of the metal shaft 2A is preferably in a range of 4.0 mm to 8.0 mm. In the case where the shaft 2 is a shaft having the high-rigidity resin base material 2B on the outer side of the metal shaft 2A, the outer diameter of the resin base material 2B is preferably in a range of 10 mm to 25 mm. By using high-rigidity resin in the shaft 2, an increase of the mass of the shaft 2 can be suppressed even in the case where the outer diameter of the shaft 2 is increased.

<Image Forming Apparatus>

An image forming apparatus according to the present disclosure comprises the above-described charging roller according to the present disclosure.

As a result of the image forming apparatus comprising the above-described charging roller according to the present disclosure, the durability of the charging roller can be enhanced and excellent image quality can be achieved.

Figure 3:
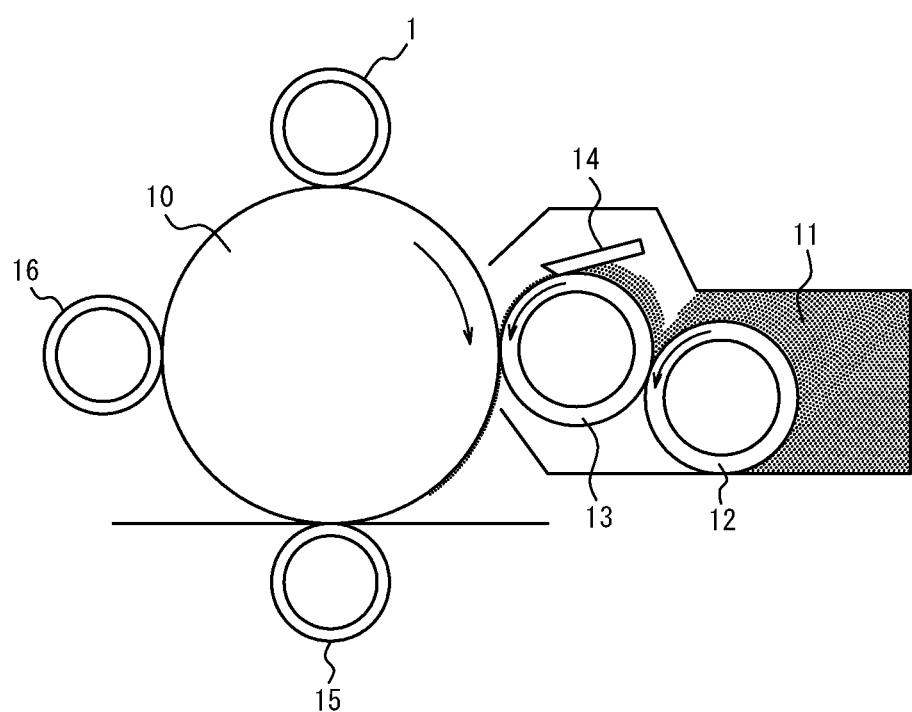
FIG. 3 is a partial sectional view schematically illustrating an embodiment of an image forming apparatus according to the present disclosure.

FIG. 3 schematically illustrates an embodiment of the image forming apparatus according to the present disclosure. The image forming apparatus in this embodiment includes: a photoreceptor 10 that holds an electrostatic latent image; the charging roller 1 located near the photoreceptor 10 (above the photoreceptor 10 in the drawing) and configured to charge the photoreceptor 10; a toner supply roller 12 configured to supply toner 11; a developing roller 13 located between the toner supply roller 12 and the photoreceptor 10; a layering blade 14 located near the developing roller 13 (above the developing roller 13 in the drawing); a transfer roller 15 located near the photoreceptor 10 (below the photoreceptor 10 in the drawing); and a cleaning roller 16 located adjacent to the photoreceptor 10. The image forming apparatus may further include known components (not illustrated) typically used in image forming apparatuses.

In the image forming apparatus illustrated in FIG. 3, first, the charging roller 1 is brought into contact with the photoreceptor 10, and a voltage is applied between the photoreceptor 10 and the charging roller 1 to charge the photoreceptor 10 to a fixed potential. An electrostatic latent image is then formed on the photoreceptor 10 by an exposure machine (not illustrated). Following this, the photoreceptor 10, the toner supply roller 12, and the developing roller 13 are each rotated in the arrow direction in the drawing, as a result of which the toner 11 on the toner supply roller 12 is conveyed to the photoreceptor 10 through the developing roller 13. The toner 11 on the developing roller 13 is made into a uniform thin layer by the layering blade 14. As a result of the developing roller 13 and the photoreceptor 10 rotating while being in contact with each other, the toner adheres to the electrostatic latent image on the photoreceptor 10 from the developing roller 13, thus visualizing the latent image. The toner adhering to the latent image is transferred to a recording medium such as paper by the transfer roller 15, and any toner remaining on the photoreceptor 10 after the transfer is removed by the cleaning roller 16.

Examples

The presently disclosed techniques will be described in more detail below by way of examples, although the present disclosure is not limited to the following examples.

The materials used to produce the charging roller of each sample are as follows:

(1) Urethane Acrylate Oligomer 100 parts by mass of a bifunctional high-purity polyol having a molecular weight of 4,000 (PREMINOL S-X4004 produced by AGC Inc., polyol made of PO chain, hydroxyl value=27.9 mgKOH/g, total unsaturation degree=0.007 meq/g, the right side of formula (I) (0.6/x+0.01)=0.03), 8.29 parts by mass of isophorone diisocyanate ((isocyanate group)/(hydroxyl group of polyol)=3/2=1.50 (molar ratio)), and 0.01 parts by mass of dibutyltin dilaurate were reacted at 70° C. for 2 hr while being stirred and mixed in a heated state, to synthesize an urethane prepolymer having an isocyanate group at both terminals of a molecular chain. Further, 100 parts by mass of the urethane prepolymer was stirred and mixed with 2.88 parts by mass of 2-hydroxyethylacrylate (HEA) and reacted at 70° C. for 2 hr, to synthesize an urethane acrylate oligomer having a molecular weight of 9,000. The viscosity of the obtained urethane acrylate oligomer at 25° C. measured using a B-type viscometer was 80,000 mPas/sec.

(2) Photopolymerization Initiator
  IRGACURE 819 (produced by BASF Japan Ltd.).
(3) Conducting Agent
  Conducting agent (i): potassium metal ion.
  Conducting agent (ii): Ketjen black (produced by Kao Corporation).
(4) Acrylic Monomer
  Ethoxylated isocyanuric acid triacrylate ("NK Ester A-9300" produced by Shin-Nakamura Chemical Co., Ltd.).

(Samples 1 to 26)

The method of producing the charging roller of each sample will be described below.

A layer-forming raw material obtained by blending 100 parts by mass of the urethane acrylate oligomer with 3 parts by mass of the photopolymerization initiator and 3 parts by mass of the conducting agent (i) was applied to the outer surface of a metal shaft of 6.0 mm in outer diameter using a die coater to a thickness of 1,500 μm. During the application, the layer-forming raw material was cured by spot UV irradiation to form a base layer. The obtained roller having the base layer formed therein was further UV-irradiated at an UV irradiation intensity of 700 mW/cm$^2$ for 5 sec while being rotated in a nitrogen atmosphere.

Next, a layer-forming raw material was produced by blending 100 parts by mass of the urethane acrylate oligomer with 3 parts by mass of the photopolymerization initiator, 3 parts by mass of the conducting agent (ii), 15 parts by mass of the acrylic monomer, and particles of the type and content shown in Tables 1 and 2 prepared beforehand (containing only "particles A" in Table 1 (samples 1 to 20), and containing "particles A" and "commercial particles" in Table 2 (samples 21 to 26)). The produced layer-forming raw material was then applied to the surface of the roller having the base layer formed therein using a roll coater, and UV-irradiated to form a surface layer with a thickness of 15 μm. The charging roller of each sample was thus obtained.

(Evaluation)

For each produced charging roller sample, printing was performed in a state in which the charging roller was incorporated in a copier ("SLX-4300LX" produced by Samsung Electronics Co., Ltd.), and the following evaluation was made.

(1) Particle Detachment

For particle detachment in the charging roller of each sample, after the charging roller was left in an environment of a temperature of 35° C. and a humidity of 80% for 24 hr and 50,000 copies were printed, whether particles detached (in the case where a plurality of types of particles were contained, whether each type of particles detached) was observed using a laser microscope (500 magnification) at three locations, namely, the surface of the axial center of the charging roller and the surfaces of the parts 25 mm away from both ends of the charging roller, and evaluation was made based on the following criteria. The results are shown in Tables 1 and 2.
  Good: no particle detachment observed.
  Poor: particle detachment observed (in at least one location).

(2) Image Quality

For the image quality of the charging roller of each sample, the horizontal streak (micro jitter) state on a printed image after printing 50,000 copies was visually observed, and evaluation was made based on the following criteria. The results are shown in Tables 1 and 2.
  Excellent: no horizontal streaks were observed.
  Good: a very few thin horizontal streaks were observed but obvious horizontal streaks were not observed.
  Poor: obvious horizontal streaks were observed.

TABLE 1

| | | 1 | 2 | 3 | 4 | 5 | 6 | 7 | 8 | 9 | 10 |
| --- | --- | --- | --- | --- | --- | --- | --- | --- | --- | --- | --- |
| | | | | | | Example | | | | | |
| Conditions of particles | Components of particles A Acrylic: ethoxylated isocyanuric acid triacrylate MMA: methyl methacrylate | Acrylic 100 mass % | | | | | Acrylic 70 mass % MMA 30 mass % | | | Acrylic 50 mass % MMA 50 mass % | |
| | Average particle size (μm) | | | 28.1 | | | | 25.6 | | 24.0 | |
| | Content of particles A in surface layer (parts by mass with respect to 100 parts of binder resin) | 10 | 35 | 80 | 120 | 25 | 50 | 80 | 115 | 17 | 65 |
| Evaluation | Particle detachment | Good | Good | Good | Good | Good | Good | Good | Good | Good | Good |
| | Image quality | Poor | Good | Excellent | Excellent | Poor | Good | Excellent | Excellent | Poor | Good |

| | | 11 | 12 | 13 | 14 | 15 | 16 | 17 | 18 | 19 | 20 |
| --- | --- | --- | --- | --- | --- | --- | --- | --- | --- | --- | --- |
| | | | Example | | | | | Comparative Example | | | |
| Conditions of particles | Components of particles A Acrylic: ethoxylated isocyanuric acid triacrylate MMA: methyl methacrylate | Acrylic 50 mass % MMA 50 mass % | | Acrylic 30 mass % MMA 70 mass % | | | | MMA 100 mass % | | | |
| | Average particle size (μm) | 24.0 | | | 22.4 | | | | 20.0 | | |
| | Content of particles A in surface layer (parts by mass with respect to 100 parts of binder resin) | 95 | 120 | 15 | 50 | 90 | 115 | 10 | 35 | 80 | 120 |
| Evaluation | Particle detachment | Good | Good | Poor | Poor | Poor | Poor | Poor | Poor | Poor | Poor |
| | Image quality | Excellent | Excellent | Poor | Poor | Poor | Poor | Poor | Poor | Poor | Poor |

TABLE 2

| | | 21 | 22 | 23 |
| --- | --- | --- | --- | --- |
| | | | Example | |
| Conditions of particles | Components of particles A Acrylic: ethoxylated isocyanuric acid triacrylate MMA: methyl methacrylate | Acrylic 100 mass % | Acrylic 70 mass % MMA 30 mass % | Acrylic 50 mass % MMA 50 mass % |
| | Content of particles A in surface layer (parts by mass with respect to 100 parts of binder resin) | 80 | 80 | 40 |
| | Types of commercial particles Commercial acrylic: ART PEARL SE-20T by Negami Chemical Industrial Co., Ltd. Commercial nylon: SP-10 by Toray Industries, Inc. Commercial melamine: EPOSTAR L15 by Nippon Shokubai Co., Ltd. | Commercial acrylic | Commercial nylon | Commercial nylon |
| | Content of commercial particles in surface layer (parts by mass with respect to 100 parts of binder resin) | 40 | 40 | 40 |
| | Total content of particles in surface layer (parts by mass with respect to 100 parts of binder resin) | 120 | 120 | 80 |
| Evaluation | Particle detachment (particles A, commercial particles) | Particles A Good / Commercial acrylic particles Poor | Particles A Good / Commercial nylon particles Poor | Particles A Good / Commercial nylon particles Poor |
| | Image quality | Excellent | Excellent | Good |

| | | 24 | 25 | 26 |
| --- | --- | --- | --- | --- |
| | | | Comparative Example | |
| Conditions of particles | Components of particles A Acrylic: ethoxylated isocyanuric acid triacrylate MMA: methyl methacrylate | Acrylic 30 mass % MMA 70 mass % | Acrylic 30 mass % MMA 70 mass % | Acrylic 30 mass % MMA 70 mass % |
| | Content of particles A in surface layer (parts | 40 | 20 | 5 |

TABLE 2-continued

|  |  | | | |
|---|---|---|---|---|
| | by mass with respect to 100 parts of binder resin) | | | |
| | Types of commercial particles | Commercial melamine | Commercial melamine | Commercial acrylic |
| | Commercial acrylic: ART PEARL SE-20T by Negami Chemical Industrial Co., Ltd. Commercial nylon: SP-10 by Toray Industries, Inc. Commercial melamine: EPOSTAR L15 by Nippon Shokubai Co., Ltd. | | | |
| | Content of commercial particles in surface layer (parts by mass with respect to 100 parts of binder resin) | 40 | 40 | 5 |
| | Total content of particles in surface layer (parts by mass with respect to 100 parts of binder resin) | 80 | 60 | 10 |
| Evaluation | Particle detachment (particles A, commercial particles) | Particles A Poor / Commercial melamine particles Poor | Particles A Poor / Commercial melamine particles Poor | Particles A Poor / Commercial acrylic particles Poor |
| | Image quality | Good | Poor | Poor |

As can be understood from the results in Table 1, the charging rollers of the samples corresponding to Example exhibited favorable results without detachment of particles in the surface layer, as compared with the charging rollers of the samples corresponding to Comparative Example.

As can be understood from the results in Table 2, in the case of using a mixture of particles, the particles A containing the same acrylic monomer as the acrylic monomer in the binder resin did not detach from the surface layer, but the commercial particles detached from the surface layer. Moreover, a certain level of image quality was achieved in the case where the content of the particles A was 40 mass % or more with respect to 100 parts by mass of the binder resin.

INDUSTRIAL APPLICABILITY

It is thus possible to provide a charging roller that can achieve excellent image quality and prevent detachment of particles in its surface layer. It is also possible to provide an image forming apparatus that can prevent detachment of particles in a surface layer of a charging roller and achieve excellent image quality.

REFERENCE SIGNS LIST 1 charging roller
2 shaft
3 base layer
4 surface layer
41 binder resin
42 particle
10 photoreceptor
11 toner
12 toner supply roller
13 developing roller
14 layering blade
15 transfer roller
16 cleaning roller

The invention claimed is:

1. A charging roller comprising a shaft and, on an outer circumferential side of the shaft, at least a base layer and a surface layer that forms a roller surface,
    wherein the surface layer contains a binder resin and particles, and the particles contain 50 mass % or more of a same component as at least one selected from components constituting the binder resin,
    a content of the particles in the surface layer is 50 parts to 120 parts by mass with respect to 100 parts by mass of the binder resin,
    the particles contain an acrylic monomer as the same component as the at least one selected from the components constituting the binder resin, and
    an average particle size of the particles is 3 µm to 30 µm.

2. The charging roller according to claim 1, wherein the base layer contains an ultraviolet curable resin.

3. The charging roller according to claim 1, wherein the acrylic monomer contains a multifunctional acrylate.

4. The charging roller according to claim 3, wherein the multifunctional acrylate is ethoxylated isocyanuric acid triacrylate.

5. The charging roller according to claim 2, wherein the binder resin in the surface layer is formed by curing an ultraviolet curable resin composition containing an urethane acrylate oligomer, a photopolymerization initiator, a conducting agent, and an acrylic monomer.

6. The charging roller according to claim 1, wherein the binder resin in the surface layer is formed by curing an ultraviolet curable resin composition containing an urethane acrylate oligomer, a photopolymerization initiator, a conducting agent, and an acrylic monomer.

7. An image forming apparatus comprising the charging roller according to claim 1.

* * * * *